United States Patent [19]

Okada

[11] Patent Number: 4,857,969

[45] Date of Patent: Aug. 15, 1989

[54] COPYING MACHINE HAVING AN INTERMEDIATE TRAY

[75] Inventor: Takehiko Okada, Sakai, Japan

[73] Assignee: Mita Industrial Co., Ltd., Osaka, Japan

[21] Appl. No.: 220,446

[22] Filed: Jul. 13, 1988

Related U.S. Application Data

[63] Continuation of Ser. No. 31,980, Mar. 30, 1987, abandoned.

[30] Foreign Application Priority Data

Mar. 31, 1986 [JP] Japan .................................. 61-74634
Mar. 31, 1986 [JP] Japan .................................. 61-74633

[51] Int. Cl.[4] .............................................. G03B 27/58

[52] U.S. Cl. ........................................ 355/72; 355/23; 355/24; 355/56

[58] Field of Search ........................ 355/23, 24, 72, 74, 355/55, 56

[56] References Cited

U.S. PATENT DOCUMENTS 4,218,133 8/1980 Biedermann .......................... 355/56
4,325,630 4/1982 Kimura et al. ........................ 355/74
4,453,819 6/1984 Wada et al. .
4,478,405 10/1984 Eertink et al. .
4,568,180 2/1986 Kogane ................................ 355/74
4,585,336 4/1986 Tanaka ................................ 355/23
4,641,953 2/1987 Oushiden et al. ..................... 355/55

FOREIGN PATENT DOCUMENTS 121906 10/1984 European Pat. Off. .
121933 10/1984 European Pat. Off. .
180984 5/1986 European Pat. Off. .
87104701 8/1987 European Pat. Off. .

*Primary Examiner*—Monroe H. Hayes
*Attorney, Agent, or Firm*—Beveridge, DeGrandi & Weilacher

[57] ABSTRACT

In a copying machine arranged to guide copying paper subjected to a first copying operation into an intermediate tray which then releases the paper for another copying operation, a manual paper feeding device feeds copying paper into the copying machine body. The manual paper feeding device is provided with a paper width setting and entering mechanism. According to paper width data set and entered, a reference position width is set by a width arrangement position setting unit. According to the reference position width thus set, a width arranging mechanism is driven to arrange paper in the intermediate tray.

11 Claims, 12 Drawing Sheets

COPYING MACHINE HAVING AN INTERMEDIATE TRAY

This application is a continuation of application Ser. No. 07/031,980, filed Mar. 30, 1987 now abandoned.

BACKGROUND OF THE INVENTION

The present invention relates to a copying machine having an intermediate tray, and more particularly to a copying machine capable of guiding paper on which an image already has been formed by a copying operation into the intermediate tray and performing another copying operation on this paper sent out from the intermediate tray to enable performance of a special copying operation such as an automatic both-side copying operation, a composite copying operation, etc.

Recently, the demand for a multi-function copying machine has become strong. As a part of such demand, there has been proposed a copying machine provided with an automatic both-side copying function capable of forming images on the both sides of a piece of paper, or a composite copying function capable of forming a composite image by copying in succession desired areas of two or more original documents.

Such a copying machine generally includes an automatic both-side copying mode selection key, a composite copying mode selection key, an intermediate tray for temporarily housing, in the inside of the copying machine, paper on which an image has been once formed by a copying operation, a paper conveying passage which passes through the intermediated tray, a paper conveying passing which does not pass through the intermediate tray, and a changeover member for selectively operating the conveying passages. However, the selection of a paper feeding cassette has to be made with a cassette selection key as conventionally done. Therefore, after any of the mode selection keys have been operated, the cassette selection key is operated to select a paper feeding cassette and a print key is then operated to perform either an automatic bothside copying operation or a composite copying operation.

The intermediate tray is provided inside thereof with a width arranging mechanism for arranging, to a reference position, one end edge of paper introduced into this tray, a motor for driving the width arranging mechanism according to the type of paper selected, and a driving force transmission mechanism (Japanese Unexamined Patent Publication No. 52427/1985).

When performing an automatic both-side copying operation, the both-side copying mode selection key is operated to select the both-side copying mode, and the cassette selection key is operated to select the desired paper feeding cassette. Paper which has been sent from the paper feeding cassette and on which a previous copying operation has been performed is introduced into the intermediate tray through the paper conveying passage by the changeover member. Then, by the motor, the width arranging mechanism is driven to arrange one end edge of the paper to a reference position. The paper is then caused to pass through the paper conveying passage from the intermediate tray. A copying operation is again performed on this paper to provides for the automatic both-side copying operation without paper jam, etc.

When performing the composite copying operation, it is sufficient to operate the composite copying mode selection key instead of the both-side copying mode selection key. The composite copying operation can be performed in the same manner as in the automatic both-side copying operation.

In the copying machine arranged as described, although certain restrictions are imposed on the type of paper which can be used in the automatic both-side copying function as selected, the print key can be operated regardless of any paper feeding cassette selected. Therefore, an erroneous selection of a paper feeding cassette results in an erroneous copy. For example, when paper oriented longitudinally is passed, respective images copied on the on the opposite sides of the paper are upside down. Such paper binded at a lateral side does not have a substantial utility. This is nothing but a bad copy.

There is a wide variety of types of paper which can be set on a stacking bypass, so that the width arrangement of paper in the intermediate tray cannot be made practical for all sizes of paper. Thus, provision is made so that paper cannot be fed from the stacking bypass when the automatic both-side copying function is selected. This prevents paper from being jammed in the intermediate tray.

Therefore, when performing for example an interrupt copying operation with the automatic both-side copying function selected, it is required to remove the paper feeding cassette mounted on the copying machine and to mount a different paper feeding cassette which houses paper of the size which can be used in the interrupt copying operation. Further, upon the completion of the interrupt copying operation, it is required to change the cassette to the original cassette. This disadvantageously complicates the operation.

Further, the type of paper which can be used for the automatic both-side copying operation is considerably limited so that the valuable automatic both-side copying function cannot be put to full practical use.

In the composite copying operation, problems similar to those in the automatic both-side copying operation arise.

SUMMARY OF THE INVENTION

It is an object of the invention to provide a copying machine capable of accurately achieving the width arrangement of paper in an intermediate tray according to the size of paper.

It is another object of the invention to provide a copying machine capable of feeding, from a manual paper feeding tray, paper on which two or more copying operations can be performed.

It is a further object of the invention to provide a copying machine capable of performing two or more copying operations on a piece of paper regardless of the paper size.

It is a still further object of the invention to provide a copying machine capable of preventing the occurrence of an erroneous copy or paper jam when two or a more copying operations are performed on a piece of paper.

It is a still further object of the invention to provide a copying machine capable of simplifying the control of the width arrangement of paper in the intermediate tray.

The copying machine having an intermediate tray in accordance with the present invention comprises a manual paper feeding device, paper width setting means, width arranging means and width arrangement position setting means.

The manual paper feeding device is disposed for feeding paper into the inside of the copying machine body and may be formed by a manual feeding tray, a stacking bypass, etc.

The paper width setting means is used for setting and entering the width data of paper placed on the manual paper feeding device. The width arranging means is disposed for arranging paper to a reference position according to the paper width, thereby to assure a proper arrangement and stacking of paper in the intermediate tray. The width arrangement position setting means is used for setting the width arrangement position of the width arranging means according to the paper width data set and entered by the paper width setting means.

Accordingly, where paper on which an image previously has been formed is guided into the intermediate tray and is then let out therefrom so that the paper is subjected again to an image forming operation and the paper was fed from a selected manual paper feeding device, the width of paper set on the manual paper feeding device is set and entered with the use of the paper width setting means, and, based on the paper width data thus set and entered, the width arrangement position of the width arranging means is set by the width arrangement position setting means. Thus, the width arranging means is operated at the width arrangement position thus set to enable placement of the paper at the reference position. This prevents the positional shift in copied images, as well as the occurrence of a paper jam and or an erroneous copy.

DETAILED DESCRIPTION OF THE PREFERRED EMBODIMENTS

Figure 15:
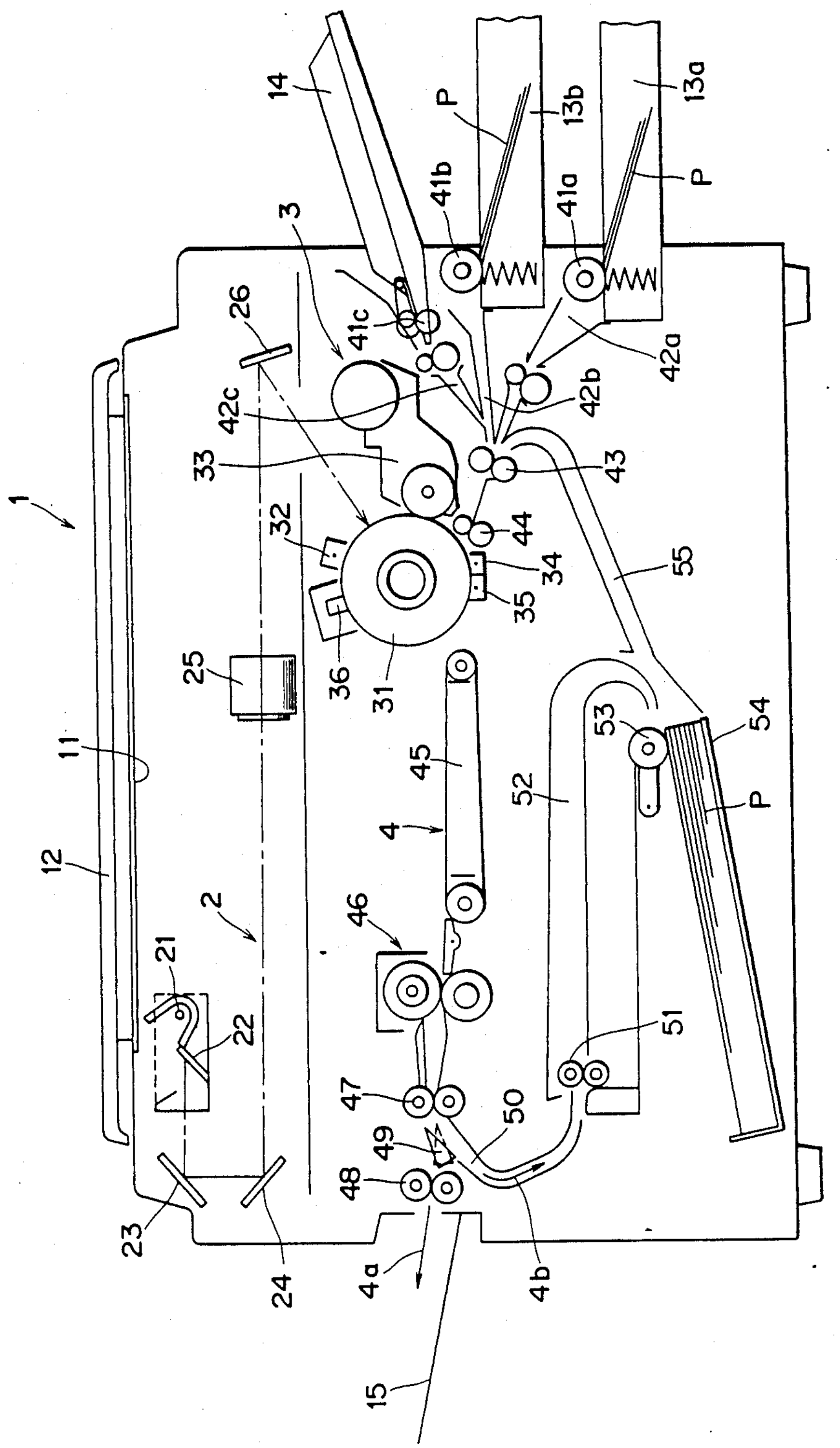
FIG. 15 is a cross-sectional view of of a copying machine having an automatic both-side copying capability.

FIG. 15 shows the inner mechanism of a copying machine having an automatic both-side copying capability. A copying machine body 1 is provided at the top thereof with a contact glass 11 and an original cover 12 and in the inside thereof with an optical system 2, a copying treatment section 3 and a conveying section 4.

The optical system 2 has a light source 21, mirrors 22, 23, 24, a lens 25 and a mirror 26. The light source 21 illuminates an original document (not shown) placed on the contact glass 11. The light reflected from the original document is guided to the copy treatment section 3 by the mirrors 22, 23, 24, the lens 25 and the mirror 26.

In the copy treatment section 3, a photoreceptor drum 31 rotatable in one direction is surrounded by a charger 32, a developing device 33, a transfer charger 34, a separation charger 35 and a cleaner 36 in this order. On the surface of the photoreceptor drum 31 uniformly charged by the charger 32, a static latent image corresponding to the image of original document is formed by guiding the light reflected from the original document onto said surface. The static latent image is then developed into a toner image by the developing device 33. The transfer charger 34 then transfers the toner image to a copying paper P. After the separation charger 35 has peeled the copying paper P from the surface of the photoreceptor drum 31, the toner remaining on the surface of the photoreceptor drum 31 is collected by the cleaner 36.

The conveying section 4 comprises a normal paper conveying unit **4*a* and a feedback paper conveying unit 4*b*. The normal paper conveying unit 4*a* includes paper feeding rollers 41*a*, 41*b*, 41*c* for successively feeding papers one by one from paper feeding cassettes 13*a*, 13*b* removably mounted on the copying machine body 1 or from a stacking bypass 14, and paper feeding passages 42*a*, 42*b*, 42*c*, resist rollers 43, conveying rollers 44, a conveying belt 45, a heat-fixation device 46, conveying rollers 47 and paper discharging rollers 48. The feedback paper conveying unit 4*b* has a changeover pawl 49 positioned between the conveying rollers 47 and the discharging rollers 48, a first guide space 50 in a curved form, conveying rollers 51, a second guide space 52, a secondary paper feeding roller 53, an intermediate tray 54 and a paper feeding passage 55**.

When only one image formation operation is to be performed on a piece of paper P, paper conveyance is carried out by the paper conveying unit **4*a* alone so that the paper is discharged to a receiving tray 15. When two or more image formation operations are to be performed on a piece of paper P, paper conveyance is alternately carried out by the paper conveying units 4*a* and 4*b***.

Figure 1:
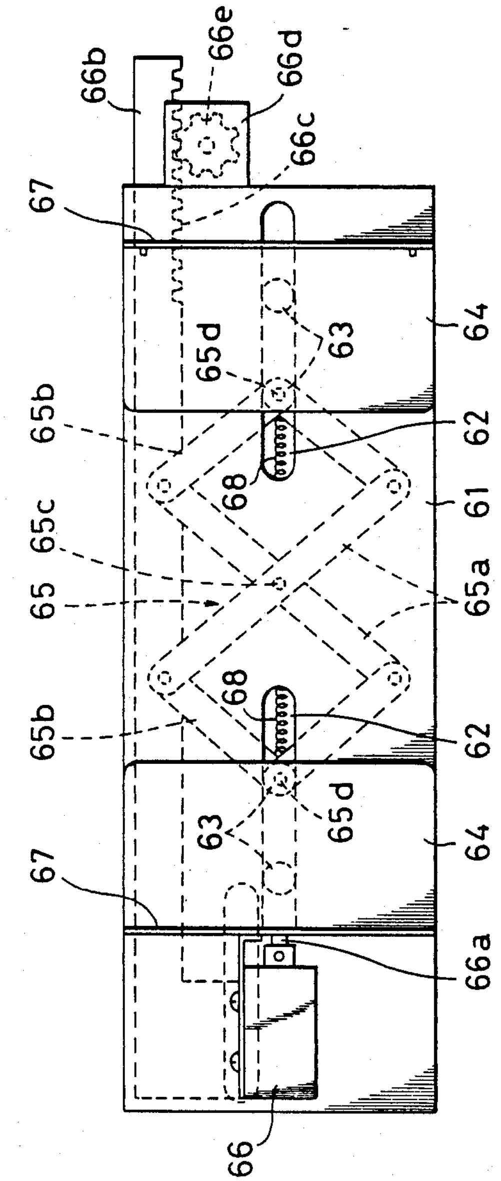
FIG. 1 is a plan view in isolation of a first embodiment of a width arranging apparatus.
Figure 2:
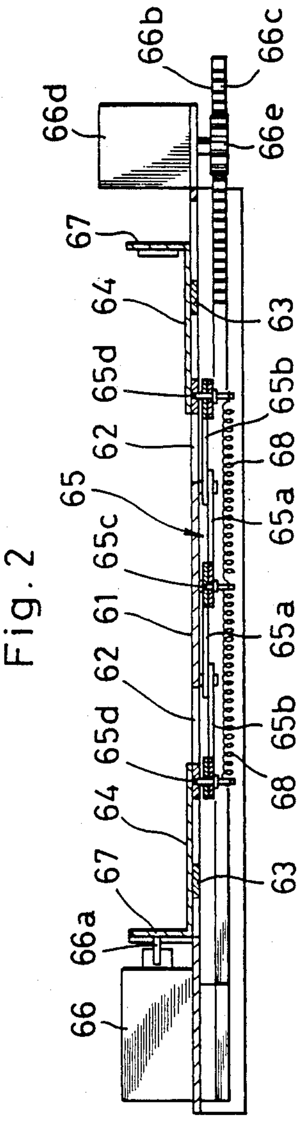
FIG. 2 is a longitudinal side view of the apparatus of FIG. 1.

FIGS. 1 and 2 show a first embodiment of a width arranging apparatus mounted on the intermediate tray.

The width arranging apparatus in accordance with the first embodiment comprises a pair of sliding members 64 which are movable toward and away from each other. Each of the sliding members 64 has a pair of engagement projections 63 which can slide in each of a pair of slots 62 formed at predetermined positions in a base plate 61 for supporting paper P. The sliding members 64 are connected to each other by a link mechanism 65 for moving the sliding members 64 an equal distance opposite directions. One of the sliding members 64 is connected to an actuating shaft **66*a* of a solenoid 66** attached to a long-size plate 66*b* at a predetermined position thereof, the plate 66*b* being slidable in a width arranging direction on the base plate 61. Standing portions 67 for width arrangement are disposed on the top surfaces of the sliding members 64 at predetermined positions thereon (the outermost positions).

The link mechanism 65 comprises a pair of long plates 65*a* having centers rotatably connected to the base plate 61, and a pair of long plates 65*b* for connecting the ends of the long plates 65*a* to the sliding members 64. Tension springs 68 are disposed between a connecting shaft 65*c* which connects the long plates 65*a* to the base plate 61 and each of connecting shafts 65*d* which connect the long plates 65*b* to the sliding members 64.

The limit positions to which the sliding members 64 can slide in the slots 62 are previously set such that the distance between these limit positions is equal to the width of paper of the type which is used most frequently in the automatic both-side copying operation (for example the transverse width of paper of the size A4). The movable distance of the sliding members 64 is previously set to about several mm.

The long-size plate 66*b* has a rack 66*c* at a predetermined position. The rack 66*c* is adapted to mesh with a pinion 66*e* secured to the rotating shaft of a stepping motor 66*d* so that the rack 66*c* slides by a distance corresponding to the amount of rotation of the stepping motor 66*d*.

The stacking bypass 14 has at a predetermined position thereon a scale (not shown) for reading the width of the paper P.

Figure 3:
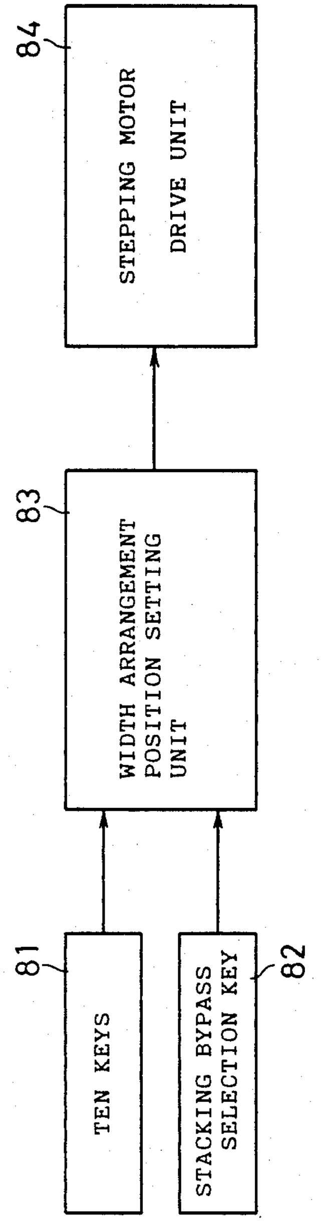
FIG. 3 is a block diagram of a width arrangement control unit.

FIG. 3 is a block diagram for a width arrangement control unit. This unit is arranged so that a numeral input signal from ten keys 81 mounted on an operation panel (not shown) and a selection signal from a stacking bypass selection key 82 are applied to a width arrangement position setting unit 83, and a setting signal from the width arrangement position setting unit 83 is applied to a stepping motor drive unit 84.

Accordingly, when the stacking bypass selection key 82 is operated to select paper feed from the stacking bypass 14 and the operator reads the width of a paper P on the scale (not shown) on the stacking bypass 14 and inputs such width data with the ten keys 81, the stepping motor drive unit 84 rotatingly drives the stepping motor 66*d* according to the width of the paper P. Together with the long-size plate 66*b*, the solenoid 66 is then moved to a predetermined position. With the sliding members 64 moved by the tension springs 68, the distance between the standing portions 67 can be made equal to the width of the paper P.

The following description will discuss the operation of the copying machine having the width arranging apparatus described above.

[I] Performance of a single image formation operation on a piece of paper P:

In this case, the changeover pawl 49 is positioned to guide the paper P sent from the conveying rollers 47 to the discharging rollers 48. On the paper P obtained from any of the paper feeding cassettes 13*a*, 13*b* or the stacking bypass 14, there is formed a toner image corresponding to the image of an original document in the copy treatment section 3. The paper P is passed through the heat-fixation device 46 to heat and fix the toner image. By the discharging rollers 48, the paper P is then discharged to the receiving tray 15 attached to the copying machine body 1 at a predetermined postion thereon.

[II] performance of two or more image formation operations on a piece of paper P:

In this case the changeover pawl 49 is positioned to guide the paper P conveyed by the conveying rollers 47 to the first guide space 50. A toner image is formed on the paper P originating from any of the paper feeding cassettes 13*a*, 13*b* or the stacking bypass 14, and then is heated and fixed.

When the paper P is obtained from any of the paper feeding cassettes 13*a*, 13*b*, the width of the paper P is fixed according to the type of the paper feeding cassette. Therefore, the stepping motor 66*d* is rotated according to the fixed width, thus facilitating the width arranging operation.

The following description will therefore discuss the operation to be performed when paper feed from the stacking bypass 14 is selected.

When paper feed from the stacking bypass 14 is selected, the following initial setting operation is to be made before performing the operation described above.

That is, in the paper P set state, the operator reads the paper width on the scale (not shown) and inputs such width data with the ten keys 81. The width arrangement position setting unit 83 then supplies a signal corresponding to the amount of rotation of the stepping motor. The solenoid 66 is moved to a position where an accurate width arrangement can be achieved for the paper P set on the stacking bypass 14. Then, the operation described is performed.

Thereafter, the paper P is guided to the first guide space 50 by the conveying rollers 47 and the changeover pawl 49 and then continuously conveyed until the tip of the paper P is guided between the conveying rollers 51.

In such state, conveying forces are applied to the paper P respectively by the conveying rollers 47 and the conveying rollers 51. Since the conveying speed of the conveying rollers 47 is equal to or higher than the conveying speed of the conveying rollers 51, no tension is applied to the paper P. The paper P can therefore pass through the first guide space 50 in a relatively free condition and is guided to the intermediate tray 54 through the second guide space 52.

The paper P guided into the intermediate tray 54 is turned upside down due to the configuration of the second guide space 52.

The secondary paper feeding roller 53 lets out the paper P, which then passes through the paper feeding passage 55 and is guided again to the copy treatment section 3. A toner image is formed on the reverse side of the paper P. With the toner image heated and fixed by the heat-fixation device 46, the paper P is conveyed by the conveying rollers 47. The position of the changeover pawl 49 is changed at a predetermined time so that the pawl now guides the paper P to the discharging rollers 48, which discharge the same to the receiving tray 15.

At the time that the paper P is introduced into the intermediate tray 54 in the course of the operations mentioned, above the solenoid 66 is energized so that the sliding members 64 are separated from each other against the tension springs 68. Therefore, the paper P can be introduced in the absence of any force which may cause the paper P to be creased or folded.

After the paper P has been introduced, power to the solenoid 66 is cut off. By the spring load of the tension springs 68, the sliding members 64 are moved in close to each other by a distance allowed by the slots 62 to achieve width arrangement for the paper P. Therefore, the center of the paper P can be placed at to the reference position.

Thus, the paper can be let out from the intermediate tray 54 and subjected to a copying operation without occurrence of a positional shift in the widthwise direction or a paper jam.

As apparent from the foregoing, in this embodiment restrictions are not imposed on the type of paper which can be used in the automatic both-side copying operation, but the width arrangement position can be input by setting and entering such position data with the ten keys. It is therefore sufficient to accurately set the amount of rotation of the stepping motor **66*d* and the stroke of the actuating shaft 66*a* of the solenoid 66**. Thus, the control of the operation status can be facilitated and the general construction can be simplified. Further, the scope of application of the automatic both-side copying function can be extended considerably.

In the embodiment discussed above, two tension springs 68 are disposed, but one tension spring may be disposed between the connecting shafts **65*d***. Instead of the link mechanism, a rack and pinion mechanism, cam means or wire means etc. can be used.

Figure 4:
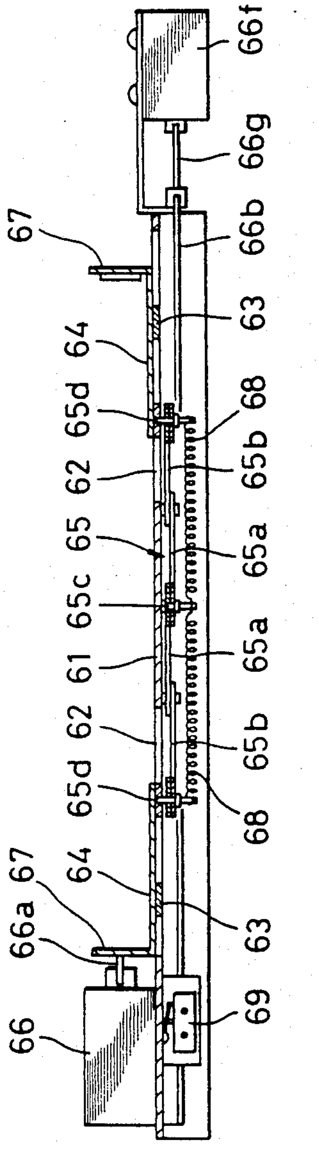
FIG. 4 is a longitudinal side view in isolation view of a second embodiment of the width arranging apparatus according to the present invention.
Figure 5:
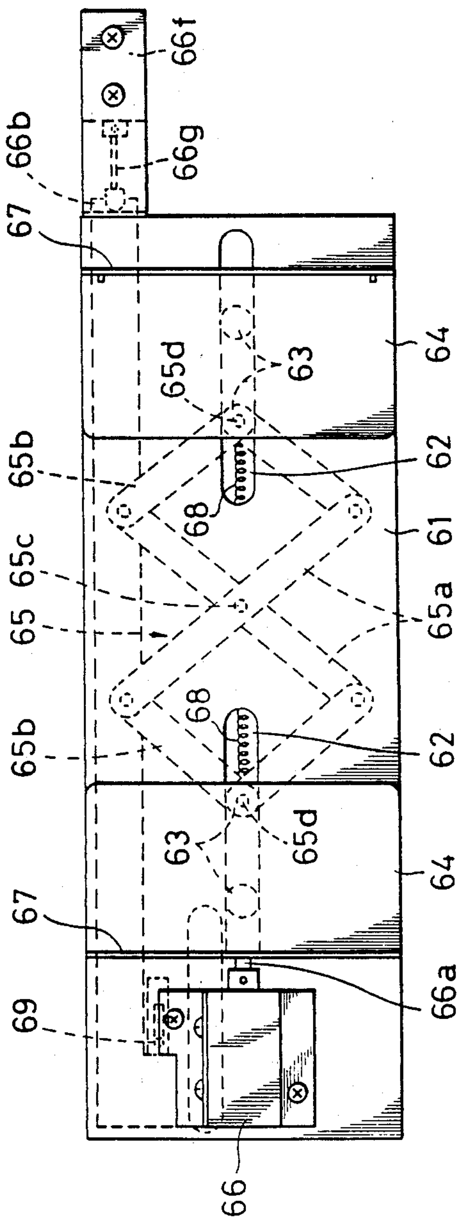
FIG. 5 is a plan view of the width arranging apparatus of FIG. 4.

FIGS. 4 and 5 show a second embodiment of the width arranging apparatus.

This second embodiment differs from the first embodiment in the following two points only.

In the second embodiment, the long-size plate **66*b* is connected to an actuating shaft 66*g* of a solenoid 66*f* so that the solenoid 66 can assume either of two positions dependent on the type of paper P (for example, transverse passage of paper of the size A4 or B5). Disposed on the base plate 61 at its predetermined position is a switch 69 which is selectively operated according to the mounting position of the solenoid 66. This switch 69 comprises a limit switch, a dip switch, etc. and is adapted to allow the use of paper of the size B5** when this switch is turned ON, and to allow the use of paper of the size A4 when this switch is turned OFF.

Figure 6:
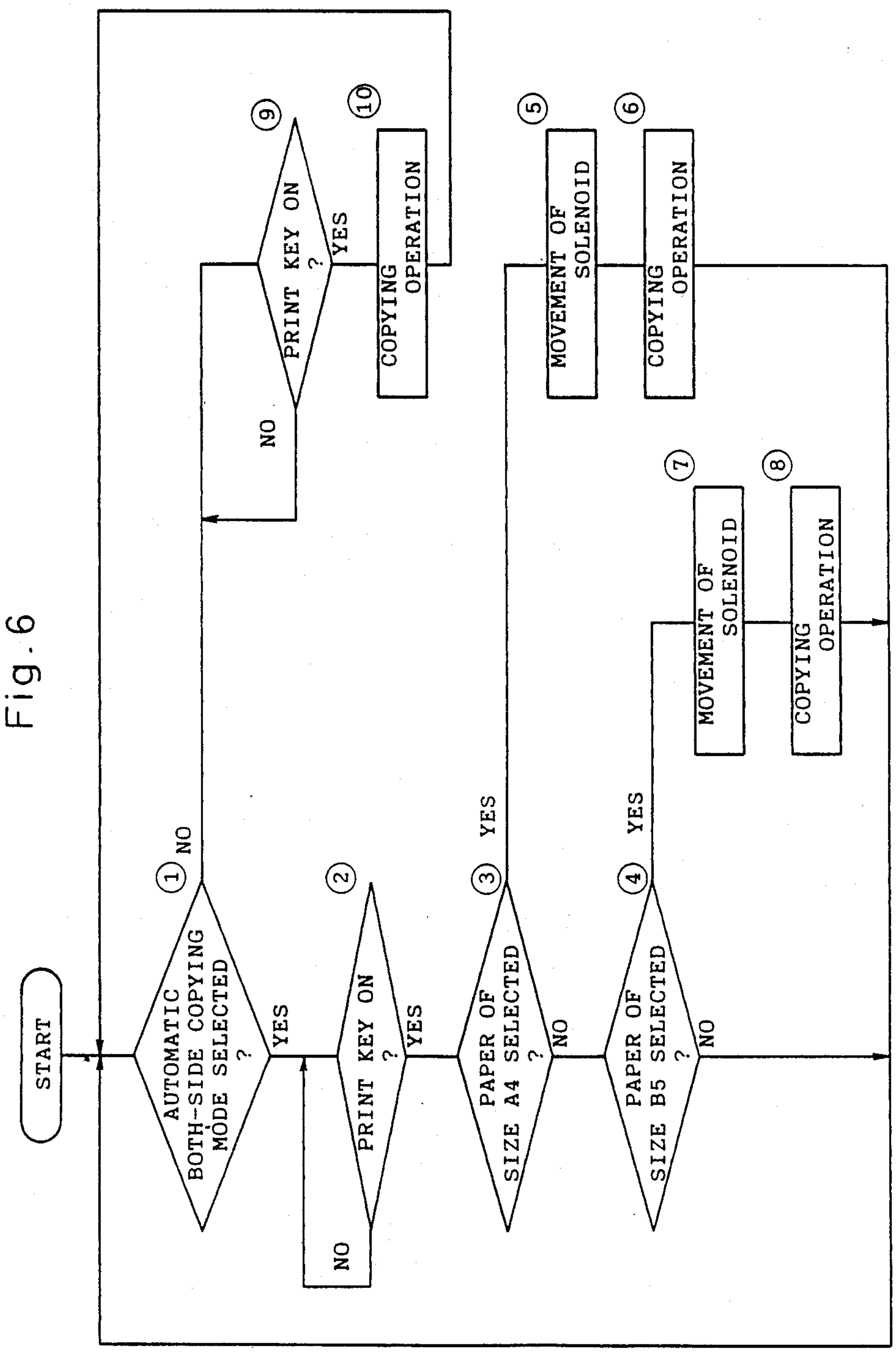
FIG. 6 is a flowchart useful for understanding the operation of the width arranging apparatus of FIG. 4.

The operation of the apparatus in the second embodiment is shown in a flowchart in FIG. 6. That is, when the automatic both-side copying mode is selected, the copying operation can be performed only when there is selected paper P of the type corresponding to the position of the solenoid 66 selected by the solenoid **66*f*. It is noted that in the second embodiment, the size of paper P is to be selected by operating a paper size selection key (not shown). The solenoid 66*f*** is driven according to the operation of the paper size selection key.

The following description will discuss in detail the operation of the second embodiment with reference to the flowchart in FIG. 6.

At the step (1), it is judged whether or not the automatic both-side copying mode is selected. When it is judged that the automatic both-side copying mode has been selected, waiting until operation of a print key (not shown) occurs at the step (2). At the steps (3) and (4), it is judged whether or not paper of the size A4 or B5 is selected. When it is judged that paper of a size other than the sizes A4 and B5 is selected, judgements and processings on and after the step (1) are carried out. That is, non-execution of copying operation prevents the introduction into the inside of the copying machine body of paper P of the size for which width arrangement cannot be achieved.

When it is judged at the step (3) that paper P of the size A4 is selected, the solenoid 66 is moved, at the step (5), to a position where width arrangement can be achieved for paper of the size A4. At the step (6), a series of copying operations are performed, and then judgements and processings on and after the step (1) will be carried out.

When it is judged at the step (4) that paper P of the size B5 is selected, the solenoid 66 is moved, at the step (7), to a position where width arrangement can be achieved for paper of the size B5. At the step (8), a series of copying operations are performed, and then judgements and processings on and after the step (1) will be carried out.

When it is judged at the step (1) that the automatic both-side copying mode is not selected, waiting until operation of the print key at the step (9). At the step (10), a series of copying operations are performed, and then judgements and processings on and after the step (1) will be carried out.

According to the second embodiment, when the automatic both-side copying mode is selected and there is set on the stacking bypass 14 paper of other size than the size for which width arrangement can be achieved, the copying operation is not performed, thus preventing the introduction into the inside of the copying machine body of paper P of the type for which width arrangement cannot be achieved.

It is also possible to change the type of paper P which can be used in the automatic both-side copying mode by changing the mounting position of the solenoid **66*f* or by using, as the solenoid 66*f*, a solenoid with an actuating shaft having a stroke different from that of the actuating shaft 66*g***.

That is, it is possible to previously select paper of the size which can be used most frequently dependent on the requirements of the user of the copying machine.

In the second embodiment, it is also possible to mount, for example, an automatic paper width reading device including optical sensor means, etc. on the stacking bypass 14 so that the paper width can be automatically set and entered. Further, when a copying operation involving either reduction or enlargement is selected, it is possible to set and enter the paper width based on the paper size and the extent of reduction or enlargement. Also, the apparatus in the second embodiment can be applied to a copying machine having a composite copying function and further can be arranged such that width arrangement is achieved to set one end edge the paper to a reference position.

In the first and second embodiments shown in FIGS. 1 to 6, when performing two or more copying operations on a piece of paper, paper can be fed from the manual paper feeding device and the width arrangement of paper in the intermediate tray can be automatically achieved according to the width of paper set in the manual paper feeding device, thus increasing applicability and improving manipulation.

Figure 7:
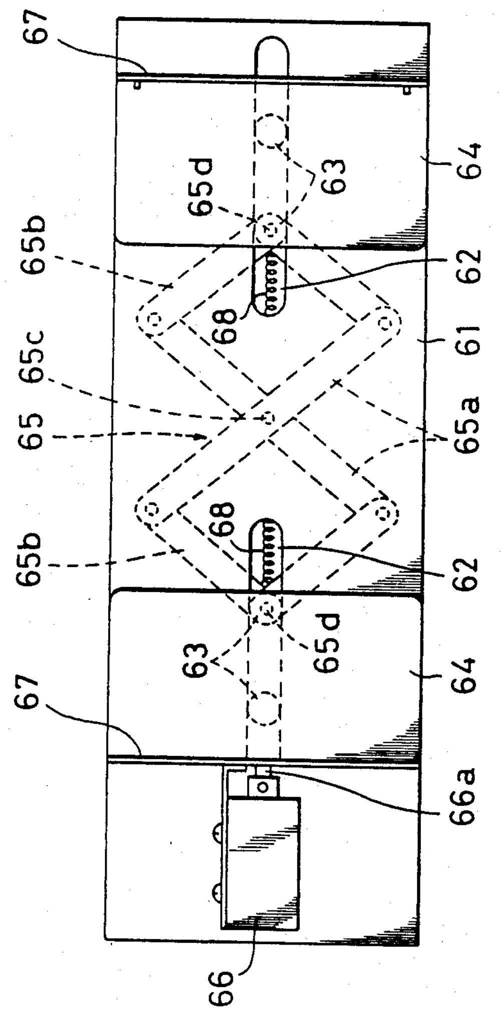
FIG. 7 is a plan view in isolation of a third embodiment of a width arranging apparatus.
Figure 8:
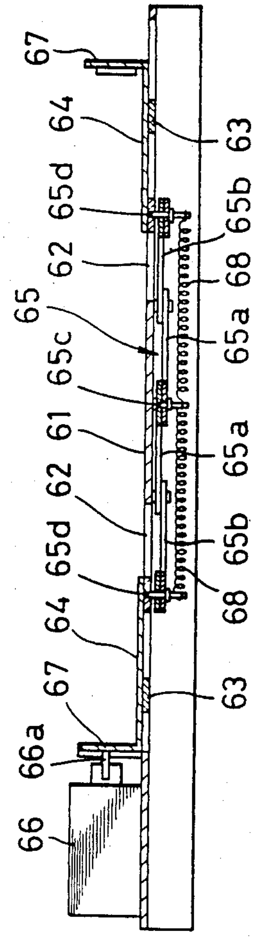
FIG. 8 is a longitudinal side view of the width arranging apparatus of FIG. 7.

FIGS. 7 and 8 show a third embodiment of the width arranging apparatus. This third embodiment is the same as the first embodiment shown in FIGS. 1 and 2 except for elimination of the long-size plate **66*b* and the stepping motor 66*d*** in the first embodiment.

In the third embodiment, by energizing the solenoid 66 the sliding members 64 can be separated from each other such that the distance between the standing portions 67 is greater than the width of paper P. On the contrary, by cutting off power to the solenoid 66, the sliding members 64 are moved in close to each other by the spring-load of the tension springs 68 such that the distance between the standing portions 67 becomes equal to the width of paper P to achieve width arrangement for the paper P.

In the third embodiment, width arrangement is achieved in one stage only. Therefore, only one size of paper P can be used in the automatic both-side copying operation, which means the size of paper to be used is limited to one size. However, this structure advantageously simplifies the mechanism of width arrangement.

Figure 9:
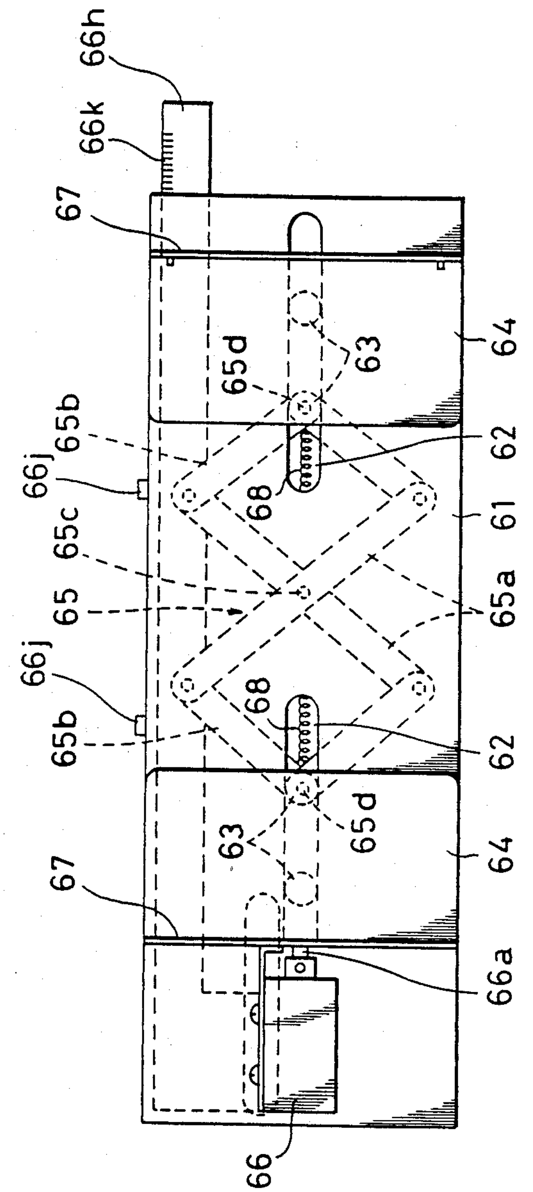
FIG. 9 is a plan view in isolation of a fourth embodiment of a width arranging apparatus.

FIG. 9 is a plan view of a fourth embodiment of the width arranging apparatus. This fourth embodiment differs from the first embodiment shown in FIGS. 1 and 2 in the following four points.

In the fourth embodiment, the stepping motor **66*d* is omitted, and a manually slidable long-size plate 66*h* is provided instead of the long-size plate 66*b* moved by the stepping motor 66*d*. The base plate 61 is provided at predetermined positions thereon with stopper means 66*j* such as screws to selectively permit the long-size plate 66*h* to slide and to prevent the long-size plate 66*h* from sliding. The long-size plate 66*h* is provided at a predetermined position with a scale 66*k* which corresponds to the paper width reading scale (not shown) on the manual paper feeding tray 14 (FIG. 15**).

In this fourth embodiment, the automatic both-side copying operation can be performed by feeding paper P from the manual paper feeding tray 14.

In more detail, with paper P set on the manual paper feeding tray 14, the paper width can be easily read on the scale (not shown). Therefore, the stopper means **66*j* are operated to permit the long-size plate 66*h* to be slidable. After the long-size plate 66*h* has been slided moved up to a position where the scale 66*k* of the long-size plate 66*h* coincides with the paper width, the stopper means 66*j* are operated to permit the long-size plate 66*h* from moved. The standing portions 67 of the sliding members 64 slidable under the action of the tension springs 68 can achieve width arrangement in conformity to the width of paper P set on the manual paper feeding tray 14**.

Figure 10:
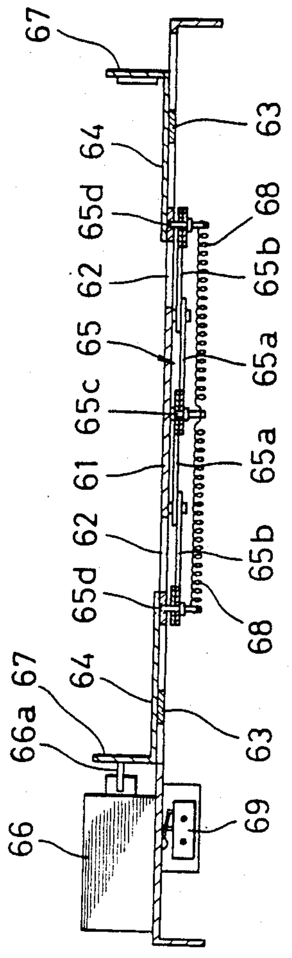
FIG. 10 is a longitudinal side view in isolation of a fifth embodiment of the width arranging apparatus.
Figure 11:
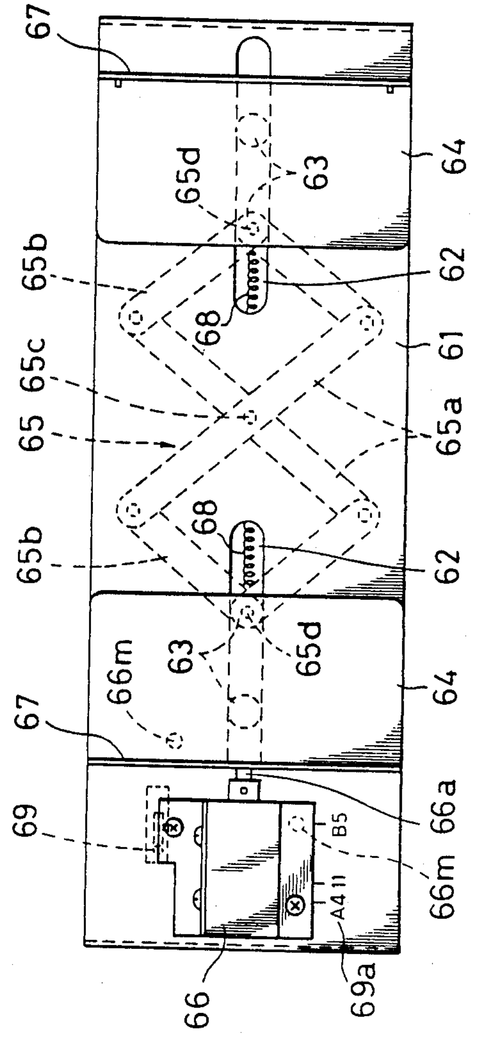
FIG. 11 is a plan view of the width arranging apparatus of FIG. 10.

FIGS. 10 and 11 show a fifth embodiment of the width arranging apparatus.

This fifth embodiment is the same as the third embodiment shown in FIGS. 7 and 8 except for the following four points.

In the fifth embodiment, the mounting position of the solenoid 66 can vary with the type of paper (for example, the transverse passing of paper of the size A4 or B5), and the base plate 61 has at its predetermined position a switch 69 which is selectively operated in dependence upon the mounting position of the solenoid 66. The switch 69 may be a limit switch or a dip switch, etc. and is adapted to allow the use of paper of the size B5 when this switch is turned ON, and to allow the use of paper of the size A4 when this switch is turned OFF. The base plate 61 has at its predetermined position a display mark **69*a* for displaying the mounting position of the solenoid according to the type of paper P, and there are formed screw holes 66*m*** corresponding to the types of paper P.

Figure 12:
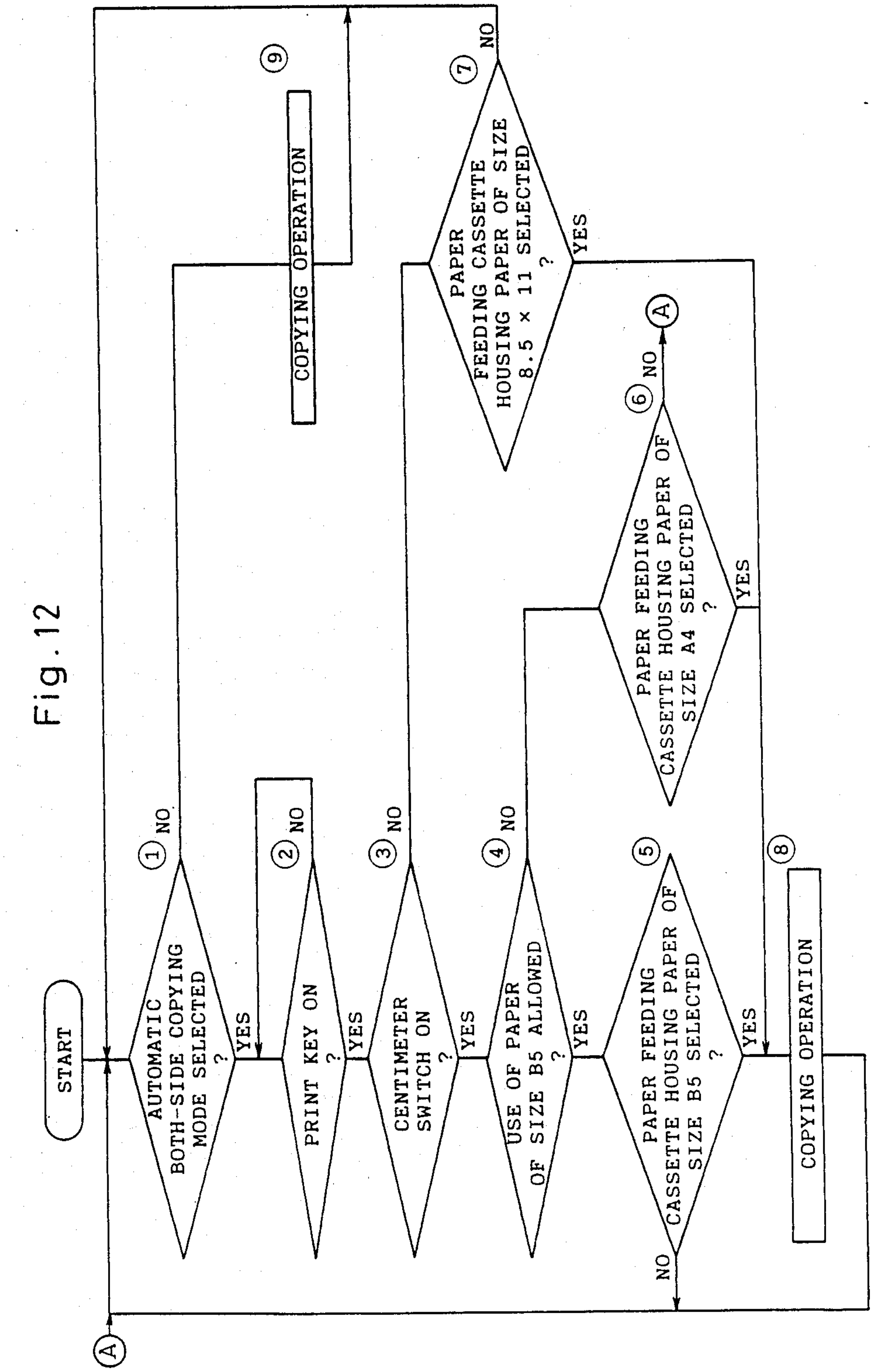
FIG. 12 is a flowchart useful in understanding an automatic both-side copying operation.

The control of the copying machine in this fifth embodiment is shown in a flowchart in FIG. 12.

When the automatic both-side copying mode is selected, a copying operation can be performed only when paper P of the type corresponding to the mounting position of the solenoid 66 is selected.

The following description will discuss in detail the operation in the fifth embodiment with reference to the flowchart in FIG. 12.

At the step (1), it is judged whether or not the automatic both-side copying mode is selected. When it is judged that the automatic both-side copying mode is selected, wailing until operation of the print key (not shown) occurs at the step (2). At the step (3), it is judged whether or not a centimeter switch (not shown) is turned ON. The centimeter switch is mounted on a circuit board in the copying machine body and is previously set according to the centimeter specification or the inch specification. When it is judged that the centimeter switch is turned ON, it is judged at the step (4) whether or not the switch 69 is turned ON, i.e., whether the use of paper P of the size B5 is allowed or whether the use of paper P of the size A4 is allowed.

At the step (4), when it is judged that the use of paper P of the size B5 is allowed, it is then judged at the step (5) whether or not the paper feeding cassette housing paper P of the size B5 is selected. At the step (4), when it is judged that the use of paper P of the size A4 is allowed, it is then judged at the step (6) whether or not the paper feeding cassette housing paper P of the size A4 is selected.

At the step (3), when it is judged that the centimeter switch is turned OFF, it is then judged at the step (7) whether or not the paper feeding cassette housing paper P of the size 8.5 inches×11 inches is selected.

At any of the steps (5), (6) and (7), when it is judged that an improper paper feeding cassette is selected, judgements and processings on and after the step (1) are carried out. That is, non-execution of the copying operation prevents the introduction of paper P into the inside of the copying machine body.

At any of the steps (5), (6) and (7), when it is judged that a proper paper feeding cassette is selected, a series of copying operations are performed at the step (8) and then judgements and processings on and after the step (1) are carried out. In such case, paper P introduced from the paper feeding cassette has a width for which width arrangement can be achieved based on the mounting position of the solenoid 66. Therefore, the width arrangement can be achieved for paper in the intermediate tray 54. Thus, a plurality of copying operations can be performed on the same paper P without the occurrence of positional shift, paper jam, etc.

At the step (1), when it is judged that the automatic both-side copying mode is not selected, a series of normal copying operations are performed at the step (9) and then judgements and processings on and after the step (1) will be carried out.

Accordingly, in this fifth embodiment, when the automatic both-side copying mode is selected and the proper paper feeding cassette is not selected, the copying operation cannot be performed to prevent the introduction into the inside of the copying machine body of paper P of the type for which width arrangement cannot be achieved.

By changing the mounting position of the solenoid 66 according to the display mark **69*a***, it is possible to change the type of paper P to be used in the automatic both-side copying mode.

That is, it is possible to previously select paper of the size which is used most frequently dependent on the requirements of the user of the copying machine.

Figure 13:
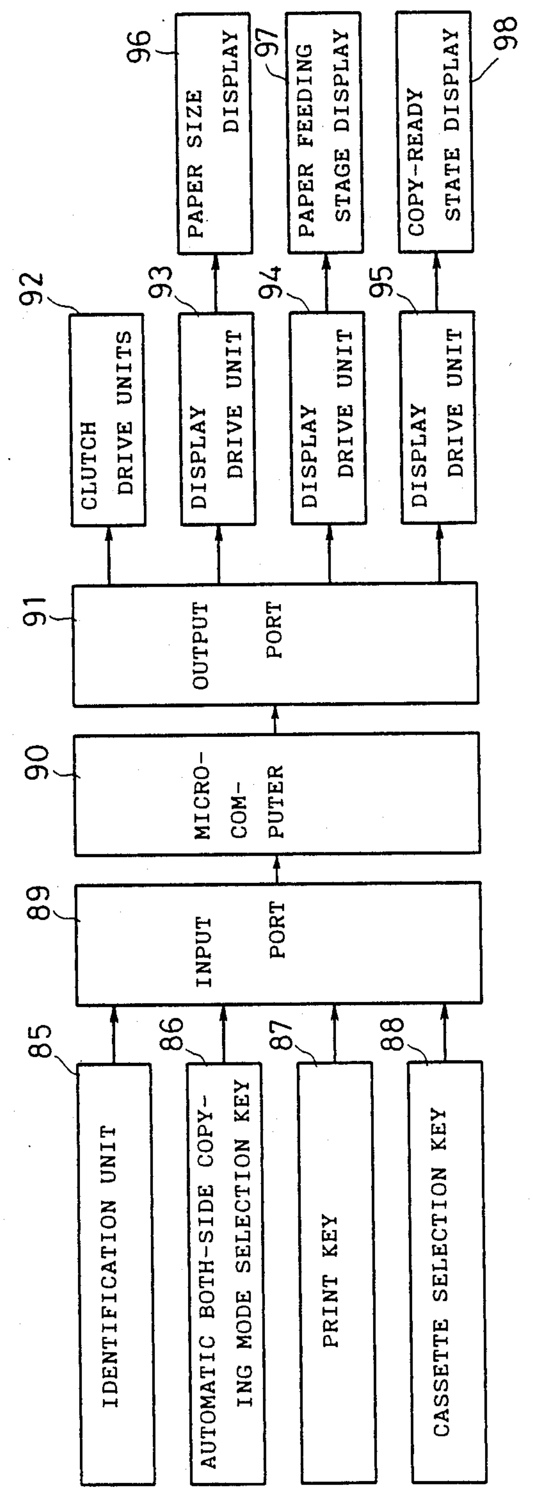
FIG. 13 is a block diagram of apparatus for automatically selecting a specific cassette.

FIG. 13 is a block diagram illustrating the arrangement of an automatic selection apparatus for automatically selecting a proper paper feeding cassette when the automatic both-side copying mode is selected.

An identification unit 85 for identifying the types of paper housed in the paper feeding cassettes mounted (which may be constituted, for example, by a plurality of magnets and lead switches), an automatic both-side copying mode selection key 86, a print key 87, and a cassette selection key 88 are connected to a microcomputer 90 through an input port 89. A control signal from the microcomputer 90 is supplied, through an output port 91, to clutch drive units 92 for controlling the drive of the respective paper feeding rollers and to display drive units 93, 94, 95. Output signals from the display drive units 93, 94, 95 are respectively supplied to a paper size display 96, a paper feeding stage display 97 and a copy-ready state display 98.

Figure 14:
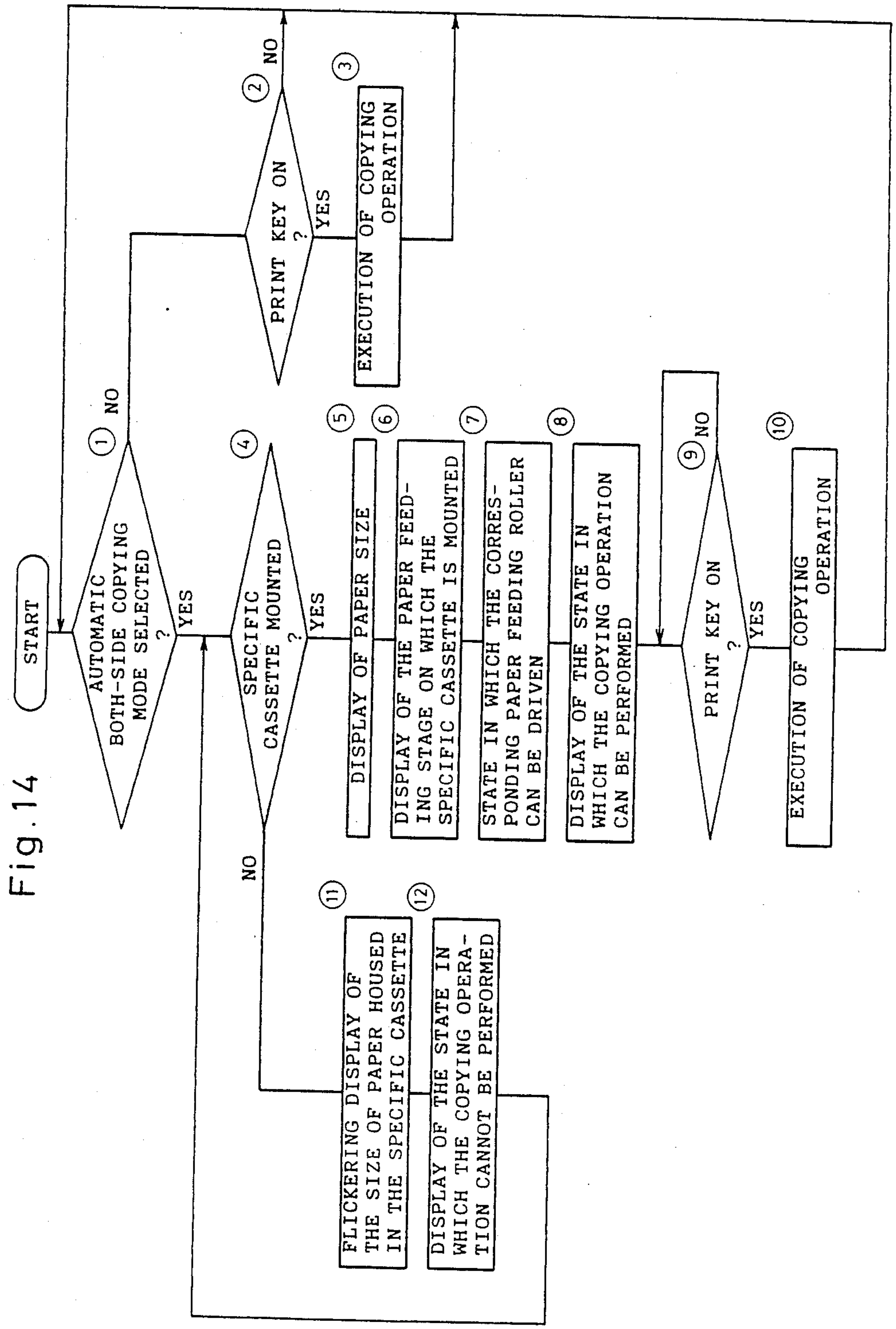
FIG. 14 is a flowchart useful in understanding the operation of selecting a specific cassette.

FIG. 14 is a flowchart illustrating the operation of a specific cassette selection apparatus.

At the step (1), it is judged whether or not the automatic both-side copying mode is selected, that is, whether or not the automatic both-side copying mode selection key 86 is operated.

When it is judged at the step (1) that the automatic both-side copying mode is not selected, the judgement at the step (1) is repeated until it is judged at the step (2) that the print key 87 has been operated. When it is judged at the step (2) that the print key 87 has been operated, paper is fed from a paper feeding cassette selected at this point and a series of copying operations are carried out at the step (3). Then, judgements and processings on and after the step (1) are carried out.

When it is judged at the step (1) that the automatic both-side copying mode is selected, it is then judged at the step (4), based on a signal from the identification unit 85, whether or not there is mounted a paper feeding cassette for paper of the size which can be used in the automatic both-side copying mode (hereinafter referred to as a specific cassette). When it is judged that the specific cassette is mounted, the paper size display 96 displays the size of paper housed in the specific cassette at the step (5). At the step (6), the paper feeding stage display 97 displays the paper feeding stage on which the specific cassette is mounted. At the step (7), the corresponding clutch drive unit 92 is prepared to transmit a driving force to the corresponding paper feeding rollers for the paper feeding stage on which the specific cassette is mounted. At the step (8), the copy-ready state display 98 displays a copy-ready state. At the step (9), waiting until operation of the print key 87 occurring and at the step (10), a series of automatic both-side copying operations are carried out. Then, judgements and processings on and after the step (1) are carried out.

When it is judged at the step (4) that the specific cassette is not mounted, the paper size display 96 intermittently displays the size of paper housed in the specific cassette at the step (11). At the step (12), the copy-ready state display 98 displays a copy-impossible state. Then, judgements and processings on and after the step (4) are carried out.

In brief, when the automatic both-side copying mode is selected with the specific cassette mounted on any of the paper feeding stages, the specific cassette is automatically selected and the specific cassette selection state is displayed and the copy-ready state is also displayed.

When the specific cassette is not mounted on any of the paper feeding stages, the size of paper housed in the specific cassette is intermittently displayed and the copy-ready display 98 is provided so that the operator can be informed that the specific cassette should be mounted.

Accordingly, when the specific cassette is mounted, the corresponding paper feeding stage is automatically selected, and when the specific cassette is not mounted, the copying operation cannot be performed. This not only prevents the occurrence of an erroneous copy, but also eliminates the cassette selection operation.

Figure 16:
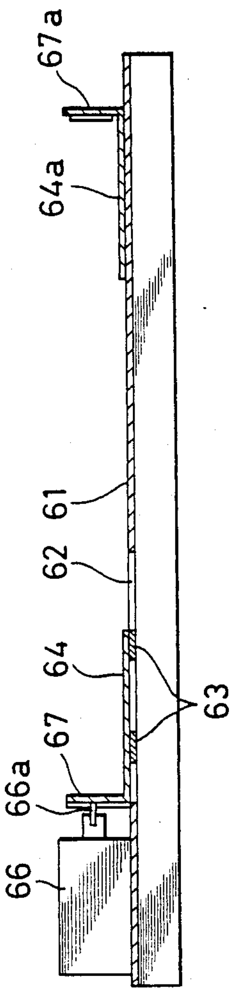
FIG. 16 is a longitudinal side view in isolation section view of a width arranging apparatus of the one-side basis type.

FIG. 16 is a longitudinal side view of a width arranging apparatus of the one-side basis type.

This embodiment differs from the third embodiment shown in FIGS. 7 and 8 in the following points.

In this embodiment in FIG. 16, instead of one slidable member 64, a member 64*a* is secured to the base plate 61, and a standing portion 67*a* for width arrangement is disposed on the top surface of the member 64*a* at its predetermined position, and the other sliding member 64 only is connected to the actuating shaft 66*a* of the solenoid 66, and the link mechanism 65 and the tension springs 68 disposed in the third embodiment are eliminated.

In this embodiment, with the operation of the solenoid 66, the end edge of paper P can be set to the position of the standing portion 67*a*. The apparatus according to this embodiment can be applied to a copying machine of the one-side basis type to prevent the paper P from being positionally shifted in the widthwise direction.

The present invention should not be limited to the embodiments described above but can be applied to a copying machine having a composite copying function. Further, a stack bypass can be used instead of the manual paper feeding tray. Other modifications and variations of the invention can be made without departing from the scope of the invention.

What is claimed is:

1. A copying machine adapted for automatic two-side copying on copying paper of only fixed, predetermined sizes, said machine comprising:

- means for forming an image on a copying paper;
- means providing a path for copying paper through said machine;
- means for moving copying paper through said path;
- an intermediate copying paper tray, located in a portion of said path, for receiving a copying paper after a first image has been formed thereon by said image forming means and holding the copying paper having the image formed thereon until said moving means moves the paper having the image formed thereon to said image forming means for a subsequent image forming operation;
- width arranging means disposed in said intermediate tray for arranging a copying paper received in said tray to a reference position, said arranging means including means for setting the width of said reference position to a width corresponding only to one of said fixed, predetermined copying paper sizes, said width setting means including a pair of slidable standing portions for contacting lateral sides of a copying paper received in said intermediate tray, a central link mechanism for guiding said standing portions together, and a solenoid connected to said standing portions for sliding said standing portions toward each other when copying paper is received in said intermediate tray;

judging means for judging whether said width of said reference position is the same as the width of a copying paper to be received in said tray; and preventing means for preventing copying operations when said judging means judges that the copying paper width and said width of said reference position are not the same.

2. A copying machined according to claim 1 wherein said width setting means is adapted to accommodate no more than three copying paper widths.

3. A copying machine according to claim 2, wherein said width setting means comprises manually slidable means.

4. A copying machine according to claim 3, further comprising sensing means for sensing said reference position width.

5. A copying machine according to claim 2, wherein said width setting means is adjustable by movably attaching said width arranging means at a desired position.

6. A copying machine according to claim 5, further comprising sensing means for sensing said reference position width.

7. A copying machine according to claim 1, further comprising a copying paper feed cassette and an identification unit mounted in said feed cassette for detecting the width of copying paper held in said cassette.

8. A copying machine according to claim 1, wherein said link mechanism includes a spring.

9. A copying machine as claimed in claim 1, wherein said central link mechanism comprises first elongated members, a shaft for pivotably connecting said first members together, and second elongate members for pivotably connecting the ends of said first members to said standing portions.

10. A copying machine as claimed in claim 9, wherein said central link mechanism further comprises spring means.

11. A copying machine adapted for automatic two-side copying on copying paper of only one size, said machine comprising;

means for forming an image on a copying paper;

means providing a path for copying paper through said machine;

means for moving copying paper through said path;

an intermediate copying paper tray, located in a portion of said path, for receiving a copying paper after a first image has been formed thereon by said image forming means and holding the copying paper having the image formed thereon until said moving means moves the paper having the image formed thereon to said image forming means for a subsequent image forming thereon;

width arranging means disposed in said intermediate tray for arranging a copying paper received in said tray to a reference position of a width corresponding to said copying paper size, said arranging means including a pair of slidable standing portions for contacting lateral sides of a copying paper received in said intermediate tray, a central link mechanism for guiding said standing portions together, and a solenoid connected to said standing portions for sliding said standing portions toward each other when copying paper is received in said intermediate tray;

judging means for judging whether said width of said reference position is the same as the width of a copying paper to be received in said tray; and preventing means for preventing copying operations when said judging means judges that the copying paper width and said width of said reference position are not the same.

* * * * *